(12) United States Patent
Honda et al.

(10) Patent No.: US 11,975,511 B2
(45) Date of Patent: May 7, 2024

(54) IN-MOLD LABEL, AND CONTAINER WITH IN-MOLD LABEL

(71) Applicant: YUPO CORPORATION, Tokyo (JP)

(72) Inventors: Shunsuke Honda, Ibaraki (JP); Takuya Ikarashi, Ibaraki (JP)

(73) Assignee: YUPO CORPORATION, Tokyo (JP)

(*) Notice: Subject to any disclaimer, the term of this patent is extended or adjusted under 35 U.S.C. 154(b) by 528 days.

(21) Appl. No.: 17/279,334

(22) PCT Filed: Sep. 26, 2019

(86) PCT No.: PCT/JP2019/037933
§ 371 (c)(1),
(2) Date: Mar. 24, 2021

(87) PCT Pub. No.: WO2020/067327
PCT Pub. Date: Apr. 2, 2020

(65) Prior Publication Data
US 2021/0394495 A1    Dec. 23, 2021

(30) Foreign Application Priority Data

Sep. 28, 2018  (JP) ................................ 2018-184065

(51) Int. Cl.
*B32B 27/08*    (2006.01)
*B32B 27/16*    (2006.01)
(Continued)

(52) U.S. Cl.
CPC .............. *B32B 27/08* (2013.01); *B32B 27/16* (2013.01); *B32B 27/20* (2013.01); *B32B 27/327* (2013.01);
(Continued)

(58) Field of Classification Search
CPC ..... G09F 2003/0272; G09F 2003/0257; G09F 2003/023; G09F 3/10; G09F 3/02;
(Continued)

(56) References Cited

U.S. PATENT DOCUMENTS

| 5,858,521 A * | 1/1999 | Okuda ...................... B32B 7/12 |
| | | 428/492 |
| 6,544,634 B1 * | 4/2003 | Abrams ............. G08B 13/2445 |
| | | 428/542.2 |

(Continued)

FOREIGN PATENT DOCUMENTS

| JP | H02-139328 A | 5/1990 |
| JP | 2004-136486 | 5/2004 |

(Continued)

OTHER PUBLICATIONS

Office Action issued in Taiwan Patent Application No. 108134988 dated Dec. 9, 2021, received on Dec. 13, 2021, English translation.

(Continued)

*Primary Examiner* — David R Dunn
*Assistant Examiner* — Christopher E Veraa
(74) *Attorney, Agent, or Firm* — GREENBLUM & BERNSTEIN, P.L.C.

(57) ABSTRACT

A decrease in the adhesiveness of an in-mold label can be suppressed even when a silicone transferred from the protective layer side to the heat-sealable resin layer side. An in-mold label includes a substrate layer, a printed layer provided on one surface of the substrate layer, and a heat-sealable resin layer provided on the other surface of the substrate layer, a protective layer containing a silicone is provided on an outermost surface on one surface side of the substrate layer on which the printed layer is provided, and an adhesive strength decrease-inhibiting layer containing a (meth)acrylic acid based copolymer having a polar group is (Continued)

provided on an outermost surface on the other surface side of the substrate layer on which the heat-sealable resin layer is provided.

7 Claims, 1 Drawing Sheet

(51) Int. Cl.
    *B32B 27/20* (2006.01)
    *B32B 27/32* (2006.01)
    *B65D 23/08* (2006.01)
    *G09F 3/02* (2006.01)
    *G09F 3/10* (2006.01)

(52) U.S. Cl.
    CPC ........... *B65D 23/0821* (2013.01); *G09F 3/02* (2013.01); *G09F 3/10* (2013.01); *B32B 2255/10* (2013.01); *B32B 2255/26* (2013.01); *B32B 2264/1022* (2020.08); *B32B 2264/104* (2013.01); *B32B 2307/31* (2013.01); *B32B 2307/402* (2013.01); *B32B 2307/41* (2013.01); *B32B 2307/518* (2013.01); *B32B 2439/00* (2013.01); *B32B 2519/00* (2013.01); *G09F 2003/023* (2013.01); *G09F 2003/0257* (2013.01); *G09F 2003/0272* (2013.01)

(58) Field of Classification Search
    CPC ............ B32B 2519/00; B32B 2439/00; B32B 2307/518; B32B 2307/41; B32B 2307/402; B32B 2307/31; B32B 2264/104; B32B 2255/26; B32B 2255/10; B32B 2264/1022; B32B 27/327; B32B 27/20; B32B 27/16; B32B 27/08; B65D 23/0821

See application file for complete search history.

(56) References Cited

U.S. PATENT DOCUMENTS

| | | | |
|---|---|---|---|
| 9,633,580 B2 | 4/2017 | Ashikaga et al. | |
| 2007/0003777 A1* | 1/2007 | Iwasa | B32B 27/08 428/523 |
| 2008/0118718 A1* | 5/2008 | Koike | B32B 27/08 428/200 |
| 2008/0233405 A1* | 9/2008 | Dronzek, Jr. | B65C 9/22 524/22 |
| 2008/0280111 A1 | 11/2008 | Blackwell et al. | |
| 2008/0280113 A1* | 11/2008 | Iwatani | B41M 5/52 428/206 |
| 2012/0231265 A1* | 9/2012 | Haruta | B32B 27/08 428/332 |
| 2014/0178682 A1* | 6/2014 | Shirai | C09J 7/22 428/354 |
| 2014/0377575 A1* | 12/2014 | Langstaff | B29C 45/14065 425/117 |
| 2016/0009018 A1 | 1/2016 | Funato et al. | |
| 2016/0260360 A1* | 9/2016 | Ueda | C08J 7/043 |
| 2016/0339678 A1* | 11/2016 | Takegami | G02B 1/04 |
| 2018/0244963 A1* | 8/2018 | Takano | C08F 220/1808 |
| 2018/0298238 A1* | 10/2018 | Koma | C08K 5/3445 |
| 2019/0112404 A1* | 4/2019 | Parris | C08F 265/02 |
| 2019/0276717 A1* | 9/2019 | Masuda | C09J 133/26 |

FOREIGN PATENT DOCUMENTS

| | | |
|---|---|---|
| JP | 2005-345793 | 12/2005 |
| JP | 2016-511437 A | 4/2016 |
| JP | 2018-60185 | 4/2018 |
| KR | 10-2012-0099027 | 9/2012 |
| KR | 10-2016-0115765 | 10/2016 |
| WO | 2006/053267 | 5/2006 |

OTHER PUBLICATIONS

Office Action issued in IN Patent Application No. 202117017231, dated Jan. 20, 2022.
OA issued ion KR Patent Application No. 10-2021-7008495, dated May 24, 2022, translation.
EESR issued in EP Patent Application No. 19867504.3, dated May 17, 2022.
Official Communication issued in International Bureau of WIPO Patent Application No. PCT/JP2019/037933, dated Dec. 17, 2019.

* cited by examiner

IN-MOLD LABEL, AND CONTAINER WITH IN-MOLD LABEL

TECHNICAL FIELD

The present invention relates to an in-mold label and an in-mold labeled container.

BACKGROUND ART

Methods for molding a resin container using a mold include a direct blow method using a parison of a raw material resin, and a stretch blow method using a preform of a raw material resin. The direct blow method is a method of forming a container by heating a raw material resin to the melting point or more to melt it to form a parison, and applying air pressure to the parison in a mold to expand it. The stretch blow method is a method of forming a container by forming a preform from a raw material resin, heating this to around the softening point, and stretching the preform by a rod in a mold and applying air pressure to expand the preform. Generally, when the raw material resin is a resin having relatively high melt viscosity such as polyethylene, the direct blow method is used, and when the raw material resin is a resin having relatively low melt viscosity such as polyethylene terephthalate, the stretch blow method in which the molding temperature is lower than in the direct blow method is used.

As the label of a resin container blow-molded as described above, an in-mold label that is thermally fused to the surface of a resin container by heat during molding is used. For example, an in-mold label in which a heat-sensitive adhesive layer containing an ethylene-vinyl acetate copolymer is laminated on a polypropylene film is used for a container made of polyethylene (see, for example, Patent Literature 1).

In addition, an in-mold label is also proposed which includes a heat-sealable resin layer containing a polyethylene resin on a substrate layer and in which the heat-sealable resin layer is subjected to surface oxidation treatment to increase adhesiveness to polyethylene terephthalate (see, for example, Patent Literature 2).

CITATION LIST

Patent Literature

Patent Literature 1: Japanese Patent Laid-Open No. 2004-136486
Patent Literature 2: Japanese Patent Laid-Open No. 2018-060185

SUMMARY OF INVENTION

Technical Problem

On the other hand, there are cases where a printed layer is formed on an in-mold label by printing for the indication of a product, and the like, and then a protective layer is provided on the printed layer to prevent scratches, dirt, and the like on the printed layer. The protective layer is formed by coating with a coating liquid referred to as an over print varnish. The coating liquid contains a curable resin, for example, an acrylic resin, a urethane resin, and an epoxy resin.

A silicone may be blended into some coating liquids for the purpose of increasing the slipperiness of the surface of an in-mold label, and the like. An in-mold label sheet is cut, stacked, and stored, or wound and stored in the form of a roll, but when a silicone is blended, the silicone may transfer from the protective layer of an in-mold label to an in-mold label stacked thereon. The in-mold label surface in contact with the protective layer is an adhesive surface to a container, but a phenomenon in which the adhesiveness decreases due to this transfer of the silicone is confirmed.

It is an object of the present invention to suppress a decrease in the adhesiveness of an in-mold label even when a silicone transfers from the protective layer side to the heat-sealable resin layer side.

Solution to Problem

The present inventors have studied diligently in order to solve the above problem, and as a result found that the above problem can be solved by providing an adhesive strength decrease-inhibiting layer containing a (meth)acrylic acid based copolymer having a polar group on the outermost surface on the heat-sealable resin layer side of an in-mold label, and completed the present invention.

Specifically, according to one aspect of the present invention, there is provided (1) an in-mold label including a substrate layer; a printed layer provided on one surface of the substrate layer; and a heat-sealable resin layer provided on the other surface of the substrate layer, wherein a protective layer containing a silicone is provided on an outermost surface on one surface side of the substrate layer on which the printed layer is provided, and an adhesive strength decrease-inhibiting layer containing a (meth)acrylic acid based copolymer having a polar group is provided on an outermost surface on the other surface side of the substrate layer on which the heat-sealable resin layer is provided.

(2) The (meth)acrylic acid based copolymer having a polar group is preferably a (meth)acrylic acid based copolymer having a cationic group.

(3) The (meth)acrylic acid based copolymer having a polar group is preferably a (meth)acrylic acid based copolymer having a tertiary amino group.

(4) The in-mold label is preferably an in-mold label for a polyethylene terephthalate resin container.

(5) The heat-sealable resin layer is preferably a polyethylene resin film having a melting point of 60 to 130° C.

According to one aspect of the present invention, there is provided (6) an in-mold labeled container in which an in-mold label is provided on a surface of a resin container, wherein the in-mold label including a substrate layer, a printed layer provided on one surface of the substrate layer, and a heat-sealable resin layer provided on the other surface of the substrate layer, a protective layer containing a silicone is provided on an outermost surface on one surface side of the substrate layer on which the printed layer is provided, and an adhesive strength decrease-inhibiting layer containing a (meth)acrylic acid based copolymer having a polar group is provided on an outermost surface on the other surface side of the substrate layer on which the heat-sealable resin layer is provided.

Advantageous Effect of Invention

According to the present invention, a decrease in the adhesiveness of the in-mold label can be suppressed even when the silicone transfers from the protective layer side to the heat-sealable resin layer side.

DESCRIPTION OF EMBODIMENTS

The in-mold label and in-mold labeled container of the present invention will be described in detail below, but the description of the configuration requirements described below provides one example (typical example) as one embodiment of the present invention, and the present invention is not specified to these contents.

In the following description, the description "(meth) acrylic" indicates both acrylic and methacrylic. A numerical value range represented using "to" means a range including the numerical values described before and after "to" as the lower limit value and the upper limit value.
(In-Mold Label)

The in-mold label of the present invention is a film laminate including a substrate layer, a printed layer provided on one surface of the substrate layer, and a heat-sealable resin layer provided on the other surface of the substrate layer. A protective layer containing a silicone is provided on the outermost surface on one surface side of the substrate layer, and an adhesive strength decrease-inhibiting layer containing a (meth)acrylic acid based copolymer having a polar group is provided on the outermost surface on the other surface side of the substrate layer.

When in-mold labels are stacked on each other, the silicone in the protective layer of an in-mold label may transfer to the heat-sealable resin layer of another in-mold label stacked on the protective layer to decrease the adhesiveness of the heat-sealable resin layer. However, in the in-mold label of the present invention, the adhesive strength decrease-inhibiting layer is provided on the outermost surface on the heat-sealable resin layer side. The adhesive strength decrease-inhibiting layer is interposed between the protective layer and the heat-sealable resin layer, and therefore the silicone can be prevented from transferring directly to the heat-sealable resin layer. A release sheet can also be provided on the surface of the protective layer in order to prevent the transfer of the silicone, but the adhesive strength decrease-inhibiting layer can be easily formed by coating or the like, and therefore low cost and the simplification of the manufacturing process can be achieved.

As long as the protective layer is provided on the outermost surface on one surface side of the substrate layer, other layers may be provided between the substrate layer and the printed layer, and between the printed layer and the protective layer. Examples of other layers include a pattern layer such as transfer foil, a hologram, and a security thread provided for the purpose of designability, forgery prevention, an intermediate layer for adjusting thickness, strength, and a functional layer such as a polarizing film.

In the same manner, as long as the adhesive strength decrease-inhibiting layer is provided on the outermost surface on the other surface side of the substrate layer, the above other layers may be provided between the substrate layer and the heat-sealable resin layer.

Figure 1:
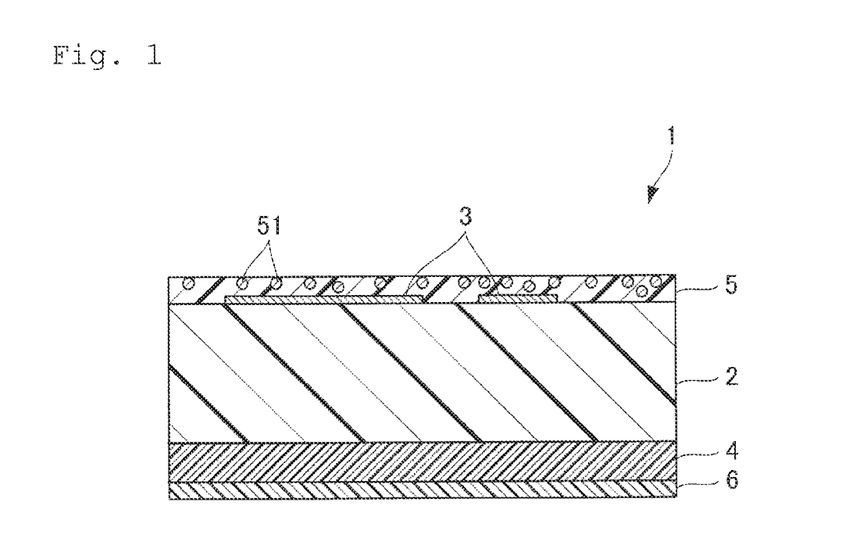
FIG. 1 is a cross-sectional view showing the configuration of the in-mold label of one embodiment.

FIG. 1 is a cross-sectional view showing the configuration of an in-mold label 1 that is one embodiment of the present invention.

As shown in FIG. 1, the in-mold label 1 includes a substrate layer 2, and a printed layer 3 and a heat-sealable resin layer 4 respectively provided on both surfaces of the substrate layer 2. In addition, the in-mold label 1 includes a protective layer 5 on the printed layer 3. The protective layer 5 is the outermost layer on one surface side of the substrate layer 2 and contains a silicone 51. The in-mold label 1 includes, on the heat-sealable resin layer 4, an adhesive strength decrease-inhibiting layer 6 that is the outermost layer on the other surface side of the substrate layer 2.
(Substrate Layer)

The substrate layer is not particularly limited as long as it can impart strength to the in-mold label. For example, the substrate layer can be a thermoplastic resin film. In other words, the substrate layer can be composed of a thermoplastic resin and the like. Examples of the thermoplastic resin include polyolefin resins, polyester resins, polyvinyl chloride resins, polyamide resins, polystyrene resins, and polycarbonate resins. The thermoplastic resin constituting the substrate layer preferably contains a polyolefin resin or a polyester resin as a main component and more preferably contains a polyolefin resin as a main component. The main component refers to a component that accounts for 50% by mass or more of the total of resins. When the thermoplastic resin constituting the substrate layer contains a polyolefin resin as a main component, the substrate layer is a polyolefin resin film.

Examples of the polyolefin resin that can be used for the substrate layer include polypropylene resins and polyethylene resins. Among these, from the viewpoint of moldability and mechanical strength, polypropylene resins are preferred.

Examples of the polypropylene resins include propylene homopolymers such as isotactic homopolypropylene and syndiotactic homopolypropylene obtained by homopolymerizing propylene, and propylene copolymers obtained by copolymerizing mainly containing propylene and an α-olefin such as ethylene, 1-butene, 1-hexene, 1-heptene, 1-octene, and 4-methyl-1-pentene. The propylene copolymers may be binary or multinary such as ternary or higher, and may be random copolymers or block copolymers.

Examples of the polyethylene resins include high density polyethylene having a density of 0.940 to 0.965 g/cm$^3$, medium density polyethylene having a density of 0.920 to 0.935 g/cm$^3$, linear low density polyethylene having a density of 0.900 to 0.920 g/cm$^3$, copolymers obtained by copolymerizing mainly containing ethylene and an α-olefin such as propylene, butene, hexene, heptene, octene, and 4-methyl pentene-1, maleic acid-modified ethylene-vinyl acetate copolymers, ethylene-vinyl acetate copolymers, ethylene-acrylic acid copolymers, ethylene-alkyl acrylate ester copolymers, ethylene-alkyl methacrylate ester copolymers, these metal salts (the metals are, for example, zinc, aluminum, lithium, sodium, and potassium) of ethylene-methacrylic acid copolymers, ethylene-cyclic olefin copolymers, and maleic acid-modified polyethylene.

The above polyolefin resins can be used singly or in combinations of two or more thereof.

Examples of the polyester resin that can be used for the substrate layer include polyethylene terephthalate resins, polybutylene terephthalate resins, and polyethylene naphthalate. Examples of the polyamide resin that can be used for the substrate layer include nylon-6, nylon-6,6, nylon-6,10, and nylon-6,12.

(Filler)

The substrate layer can contain a filler in the thermoplastic resin film constituting the substrate layer. When the filler is contained, pores are easily formed inside the film, and a porous film having a high degree of whiteness or high opacity is easily obtained. The degree of whiteness or opacity of the in-mold label can be adjusted by the type of the filler, the content of the filler, the particle diameter of the filler, film stretching conditions, and the like.

Examples of the filler that can be used for the substrate layer include inorganic fillers or organic fillers.

Examples of the inorganic fillers include heavy calcium carbonate, light calcium carbonate, calcined clay, silica, diatomaceous earth, white clay, talc, titanium oxide such as rutile titanium dioxide, barium sulfate, aluminum sulfate, zinc oxide, magnesium oxide, mica, sericite, bentonite, sepiolite, vermiculite, dolomite, wollastonite, and glass fibers. Among these, heavy calcium carbonate, clay, or diatomaceous earth has good pore moldability and is inexpensive and therefore is preferred. For the purpose of dispersibility improvement and the like, the surface of the inorganic filler may be surface-treated with a surface treatment agent such as a fatty acid.

When the thermoplastic resin constituting the substrate layer contains a polyolefin resin as a main component, examples of the organic fillers include polyethylene terephthalate, polyethylene naphthalate, polybutylene terephthalate, polyamides, polycarbonates, polystyrene, cyclic olefin homopolymers, ethylene-cyclic olefin copolymers, polyethylene sulfide, polyimides, polymethacrylates, polyethyl ether ketone, polyphenylene sulfide, and melamine resins incompatible with polyolefin resins.

The filler that the substrate layer contains may be one of the above inorganic fillers or organic fillers, or a combination of two or more.

From the viewpoint of increasing the degree of whiteness or opacity of the substrate layer, the content of the filler in the substrate layer is preferably 10% by mass or more, more preferably 15% by mass or more. From the viewpoint of increasing the uniformity of forming the substrate layer, the content of the filler in the substrate layer is preferably 70% by mass or less, more preferably 60% by mass or less, and further preferably 50% by mass or less. Therefore, the content of the filler in the substrate layer is preferably 10 to 70% by mass, more preferably 10 to 60% by mass, and further preferably 15 to 50% by mass.

The average particle diameter of the inorganic filler or the organic filler is preferably 0.01 μm or more, more preferably 0.05 μm or more, and further preferably 0.1 μm or more from the viewpoint of the ease of the formation of pores. From the viewpoint of imparting mechanical strength such as tear resistance, the average particle diameter of the inorganic filler or the organic filler is preferably 15 μm or less, more preferably 5 μm or less, and further preferably 2 μm or less. Therefore, the average particle diameter of the inorganic filler or the organic filler is preferably 0.01 to 15 μm, more preferably 0.05 to 5 μm, and further preferably 0.1 to 2 μm.

The average particle diameter of the inorganic filler is a volume-average particle diameter corresponding to 50% in volume accumulation (cumulative 50% particle diameter) measured by a particle measuring apparatus, for example, a laser diffraction particle diameter distribution measuring apparatus (Microtrac, manufactured by NIKKISO CO., LTD.). The average particle diameter of the organic filler is the average dispersed particle diameter when the organic filler is dispersed in the thermoplastic resin by melting and kneading, and dispersion. For the average dispersed particle diameter, a cut surface of the thermoplastic resin film containing the organic filler is observed by an electron microscope, the maximum diameters of at least 10 particles are measured, and the average dispersed particle diameter can be obtained as their average value.

The substrate layer can contain additives such as an antioxidant such as a sterically hindered phenol, phosphorus, amine, or sulfur antioxidant; a light stabilizer such as a sterically hindered amine, benzotriazole, or benzophenone light stabilizer; a dispersing agent; a lubricant; and an antistatic agent according to the purpose.

The content of the additives in the substrate layer can usually be 0.001 to 3% by mass independently for each type of additive from the viewpoint of suppressing a decrease in printability while obtaining sufficient effects of the additives.

(Thickness)

The thickness of the substrate layer is preferably 20 μm or more, more preferably 40 μm or more, from the viewpoint of suppressing the occurrence of creases during printing and making fixation at the target position easy during insertion into the inside of a mold. From the viewpoint of suppressing strength decrease due to the thinning of a container in a label boundary portion when providing the in-mold label on the container, the thickness of the substrate layer is preferably 200 μm or less, more preferably 150 μm or less. Therefore, the thickness of the substrate layer is preferably 20 to 200 μm, more preferably 40 to 150 μm.

The substrate layer may be a single-layer structure or a multilayer structure. In the case of a multilayer structure, the layers can impart various functions such as white opaqueness, adhesiveness to the ink used for the printed layer, heat insulating properties, and easy peelability.

Examples of a suitable transparent substrate layer include a polypropylene unstretched film (CPP film), a polypropylene biaxially stretched film (BOPP film), a polyethylene terephthalate unstretched film (CPET film), and a polyethylene terephthalate biaxially stretched film (BOPET film) containing no filler.

Examples of a suitable opaque substrate layer include a CPP film, a BOPP film, a CPET film, and a BOPET film containing a filler.

The surface of the substrate layer may be activated by activation treatment from the viewpoint of increasing the adhesiveness to the printed layer. Examples of the activation treatment include corona discharge treatment, flame treatment, plasma treatment, glow discharge treatment, and ozone treatment. Among these, corona discharge treatment or flame treatment are preferred, and corona treatment is more preferred.

From the same viewpoint, a printable layer may be provided between the substrate layer and the printed layer. The printable layer preferably contains at least one of a binder and an antistatic agent in order to increase the adhesiveness to the printed layer. In addition, the printable layer can contain additives such as an antiblocking agent, a colorant, an antifoaming agent, and a fungicide, as needed.

Examples of the binder include polyvinyl alcohol, polyvinylpyrrolidone, polyoxyalkylene derivatives, polyethylenimine and derivatives thereof, polyacrylic acid copolymers, and urethane resins. Among these, polyethylenimine or derivatives thereof are preferred for a substrate layer composed of a thermoplastic resin containing a polyolefin resin as a main component.

Examples of the antistatic agent include nonionic, cationic, or anionic surfactants or polymers, metal salts, and electrically conductive metal oxides. When the binder is polyethylenimine, a cationic polymer is preferred as the antistatic agent. When the binder is a polyoxyalkylene derivative, a lithium salt is preferred as the antistatic agent.

The surface resistivity of the in-mold label is preferably adjusted to $1\times10^2$ to $1\times10^{13}\Omega$, more preferably $1\times10^6$ to $1\text{-}10^{12}\Omega$, by the fact that the printable layer contains the antistatic agent.

The binder more preferably contains a crosslinking agent. Examples of the crosslinking agent include bi- or higher functional substances having a hydroxy (hydroxyl) group, a carboxy group, an epoxy group, an isocyanate group, an aldehyde group, an oxazoline skeleton, a carbodiimide skeleton as a reactive functional group.

The printable layer is preferably formed by coating the substrate layer with a coating liquid obtained by dissolving or dispersing the above substances in a medium such as water, followed by drying, from the viewpoint of the ease of forming.

The amount of solids in the printable layer per surface after drying is usually 0.01 to 7 g/m².

(Printed Layer)

The printed layer is formed by printing for the purpose of providing a design or information such as a pattern, a trade name, a manufacturer name, a method of use, or a bar code. The printing method is not particularly limited, and known printing methods such as gravure printing, offset printing, flexographic printing, seal printing, and screen printing can be used. In addition, inks such as an oily ink, an oxidative polymerization-curable ink, an ultraviolet-curable ink, an aqueous ink, and a liquid toner ink can be used according to the printing method.

For the printed layer, printing by the above printing methods is not limited, and printing by various printers, stamping such as hot stamping and cold stamping, and conventionally known decoration such as transfer foil and a hologram can also be included.

(Protective Layer)

The protective layer is located on the outermost surface on one surface side of the substrate layer on which the printed layer is provided. The protective layer contains a silicone and thus can decrease the coefficient of friction of the outermost surface and decrease damage, dirt, and the like on the printed layer. The silicone is a silicon compound having a polysiloxane bond.

The content of Si atoms in the protective layer is preferably 1 atm or more, more preferably 2 atm % or more, and further preferably 3 atm r or more from the viewpoint of decreasing the coefficient of friction to increase slipperiness. From the viewpoint of decreasing bleedout, the content of Si atoms in the protective layer is preferably 15 atm or less, more preferably 8 atm % or less, and further preferably 6 atm % or less. Therefore, the content of Si atoms in the protective layer is preferably 1 to 15 atm %, more preferably 2 to 8 atm %, and further preferably 3 to 6 atm %.

The above content of Si atoms can be obtained as Si atom concentration measured by the XPS method.

The protective layer is preferably formed by coating the substrate layer on which the printed layer is provided, with a coating liquid containing a silicone, from the viewpoint of making forming easy. As the coating liquid, usually, a coating liquid referred to as an Over Print (OP) varnish can be used. The OP varnish is generally a coating liquid having high transparency that contains a resin that is cured by visible light, ultraviolet rays, oxidative polymerization. As the coating liquid, a commercial product of an OP varnish previously containing a silicone can also be used, or a coating liquid prepared by mixing a silicone into an OP varnish containing no silicone can also be used.

A visible light-curable or ultraviolet-curable OP varnish is obtained, for example, by blending 40 to 80% by mass of a radical-reactive monomer and 20 to 60% by mass of a polymer having a radical-reactive group, and based on 100 parts by mass of a mixture thereof, 0.5 to 3 parts by mass of a crosslinking agent, 1 to 5 parts by mass of a photoreaction initiator, and 0 to 3 parts by mass of an antiblocking agent such as silica.

Examples of commercial products of visible light-curable or ultraviolet-curable OP varnishes containing no silicone include an OP varnish (product name: L Carton OP Varnish KS manufactured by T&K TOKA CO., LTD.). Examples of a silicone to be blended into an OP varnish containing no silicone include a combination of a silicone basis (product name: UV Reactive Silicone A manufactured by T&K TOKA CO., LTD.) and a silicone aid (product name: UV Reactive Silicone B manufactured by T&K TOKA CO., LTD.).

A coating liquid can also be prepared by mixing an OP varnish containing no silicone and an OP varnish containing a silicone. Examples of the OP varnish containing a silicone include UV Release OP Varnish Series (product name: UV Release OP Varnish UP-200 manufactured by T&K TOKA CO., LTD., product name: UV Release OP Varnish UP-2 manufactured by T&K TOKA CO., LTD., and product name: UV Release OP Varnish A-3 manufactured by T&K TOKA CO., LTD.).

An oxidative polymerization-curable OP varnish is a so-called oily OP varnish obtained, for example, by blending 80 to 99% by mass of a urethane resin, a phenol maleic acid resin as a resin component, and 1 to 20% by mass of a cellulose derivative, a vinyl chloride, a vinyl acetate copolymer and based on 100 parts by mass of a mixture thereof, 50 to 250 mass of a solvent component such as a mineral oil, a vegetable oil, an alcohol such as 2-propanol, an ester such as propyl acetate, and an aliphatic hydrocarbon such as methylcyclohexane.

Commercially available oily OP varnishes generally often originally contain a silicone as a release agent, but a silicone can be blended for adjustment to the target content of Si atoms, in the same manner as OP varnishes of a type that is cured by visible light or ultraviolet rays.

The thickness of the protective layer differs depending on the printing method but is usually 0.5 to 20 μm, preferably 1 to 10 μm, and more preferably 1.5 to 8 μm. The slipperiness or the abrasion resistance tends to increase as the protective layer becomes thicker, whereas poor curing tends to be more easily suppressed as the protective layer becomes thinner.

(Heat-Sealable Resin Layer)

The heat-sealable resin layer is provided for the purpose of increasing the adhesiveness of the in-mold label to a container. During the in-mold molding of a container, the in-mold label is provided inside a mold so that the container and the heat-sealable resin layer face each other. The heat-sealable resin layer melts by heat during the in-mold molding, and the in-mold label thermally fuses to the surface of the container.

The methods of in-mold molding include a direct blow method using a parison of a raw material resin, and a stretch blow method using a preform of a raw material resin. The direct blow method is a method of forming a container by heating a raw material resin to the melting point or more to melt it to form a parison, and applying air pressure to the parison in a mold to expand it. The stretch blow method is a method of forming a container by heating a preform previously formed from a raw material resin to around the softening point of the raw material resin, and stretching the preform by a rod in a mold and applying air pressure to expand the preform.

The heat-sealable resin layer of the in-mold label of the present invention has high adhesiveness, particularly to containers made of polyethylene terephthalate (PET) resins. PET has low melt viscosity, and it is difficult to keep the shape of a parison in a molten state, and therefore, usually, a PET resin container is formed by the stretch blow method in which heating is performed to around the softening point rather than the melting point. Therefore, the thermal fusion of the in-mold label to a PET resin container is also performed in a heating temperature region around the softening point rather than the melting point of the PET resin. For a PET resin container molded in this manner, the heat-sealable resin layer is preferably a film of a thermoplastic resin having a low melting point of 60 to 130° C. from the viewpoint of sufficiently melting the heat-sealable resin of the in-mold label to increase the adhesiveness to the container even under lower temperature molding conditions than those of the direct blow method in which heating is performed to the melting point or more. As the melting point becomes lower, sufficient adhesiveness is obtained with a smaller amount of heat, and thus the melting point of the thermoplastic resin used for the heat-sealable resin layer is more preferably 110° C. or less, further preferably 100° C. or less. As the melting point becomes higher, film forming becomes easier, and sticking to a roll during film manufacture, and the like are also more easily decreased. Therefore, the melting point of the thermoplastic resin is more preferably 70° C. or more, further preferably 75° C. Therefore, the melting point of the thermoplastic resin is more preferably 70 to 110° C., further preferably 75 to 100° C.

The above melting point can be measured by Differential Scanning Calorimetry (DSC).

Preferred examples of the thermoplastic resin that can be used for the heat-sealable resin layer include polyethylene resins having a melting point of 60 to 130° C. such as low density or medium density polyethylene having a density of 0.900 to 0.935 g/cm$^3$, linear low density polyethylene having a density of 0.880 to 0.940 g/cm$^3$, ethylene-vinyl acetate copolymers, ethylene-acrylic acid based copolymers, ethylene-alkyl acrylate ester copolymers, ethylene-alkyl methacrylate ester copolymers in which the number of carbon atoms of the alkyl group is 1 to 8, and metal salts of ethylene-methacrylic acid copolymers with Zn, Al, Li, K, Na, and the like. Among these, low density or medium density polyethylene having a degree of crystallinity of 10 to 60% as measured by an X-ray method, and a number-average molecular weight of 10,000 to 40,000, or linear low density polyethylene is preferred.

From the viewpoint of increasing adhesiveness, and decreasing blocking when stacking the in-mold labels on each other, a copolymer having a polar structural unit and a nonpolar structural unit is preferably used as the thermoplastic resin of the heat-sealable resin layer.

Examples of the polar structural unit include a structural unit having a chlorine atom, a vinyl acetate structural unit, a (meth)acrylic acid structural unit, a (meth)acrylate structural unit (the number of carbon atoms of the alkyl group is preferably 1 to 8), a maleic anhydride structural unit, a urethane structural unit, and an amide structural unit. Among these, a vinyl acetate structural unit, a (meth)acrylic acid structural unit, a (meth)acrylate structural unit, or a maleic anhydride structural unit is preferred.

Examples of the nonpolar structural unit include olefin structural units having 2 to 8 carbon atoms such as an ethylene structural unit and propylene, and among these, an ethylene structural unit is preferred. More specifically, when the above polar structural unit is copolymerized with polyethylene, the melting point decreases and is easily adjusted to a melting point at which in-mold molding is easy, for example, within the range of the molding temperature of the stretch blow method.

The polar structural unit in the above copolymer may be a unit in which a nonpolar structural unit is modified with a carboxylic acid. Examples of the modification method include a method of blending a radical-generating agent such as an organic peroxide, and a modifier such as maleic anhydride into a polyolefin resin that is the main skeleton, and kneading the blend in a molten state in an extruder. Examples of the copolymer obtained by this method include maleic acid-modified polyolefin resins.

Preferred examples of the copolymer having a nonpolar structural unit and a polar structural unit include ethylene-vinyl ester copolymers or ethylene-α,β-unsaturated carboxylates.

Preferred examples of the ethylene-vinyl ester copolymers include ethylene-vinyl acetate copolymers (EVA).

The melt mass flow rate of EVA (JIS K 6924-1: 1997) is preferably 1 to 30 g/10 min from the viewpoint of moldability.

The vinyl acetate content of EVA (JIS K 6924-1: 1997) is preferably 5 to 40% by mass, more preferably 8 to 30% by mass, from the viewpoint of adhesiveness improvement. As the vinyl acetate content of EVA becomes higher, sufficient polarity is more easily obtained, and the adhesiveness improves more easily. As the vinyl acetate content of EVA becomes lower, flexibility is more easily obtained, and the adhesiveness improves more easily.

The density of EVA (JIS K 6924-2: 1997) is preferably 9.30 to 9.50 from the viewpoint of adhesiveness improvement.

Preferred examples of the ethylene-α,β-unsaturated carboxylates include ethylene-methyl methacrylate copolymers (EMMA).

For the heat-sealable resin layer, one thermoplastic resin may be used alone, or two or more thermoplastic resins may be mixed and used. In the latter case, from the viewpoint of suppressing peeling, the compatibility of the two or more resins mixed is preferably high.

The heat-sealable resin layer preferably contains a tackifier or a plasticizer from the viewpoint of improving adhesiveness to polar resins typified by polyester resins, particularly polyethylene terephthalate resins.

Examples of the tackifier include hydrogenated petroleum resins, aromatic hydrocarbon resins, and aliphatic hydrocarbon resins. Examples of the hydrogenated petroleum resins include partially hydrogenated petroleum resins. Examples of the aromatic hydrocarbon resins include terpene resins, rosin resins, and styrene resins.

One tackifier or plasticizer may be used alone, or two or more tackifiers or plasticizers may be mixed and used. From the viewpoint of suppressing peeling, the compatibility with the thermoplastic resin used for the heat-sealable resin layer is preferably high.

The heat-sealable resin layer can contain additives generally used in the field of polymers, such as an antifogging agent, a lubricant, an antiblocking agent, an antistatic agent, an antioxidant, a heat stabilizer, a light stabilizer, a weathering stabilizer, and an ultraviolet-absorbing agent, as needed.

The content of these additives in the heat-sealable resin layer is usually 0.01 to 5, by mass independently for each type of additive.

The heat-sealable resin layer may be a single-layer structure of only the above-described thermoplastic resin film, or a multilayer structure. In the case of a single-layer structure, the thickness of the heat-sealable resin layer is preferably 0.5 µm or more, more preferably 0.7 µm or more, and further preferably 1 µm or more from the viewpoint of increasing adhesiveness. The thickness of the heat-sealable resin layer is preferably 10 µm or less, more preferably 3 µm or less, and further preferably 2 µm or less from the viewpoint of suppressing cohesive failure inside the heat-sealable resin layer. Therefore, the thickness of the heat-sealable resin layer is preferably 0.5 to 10 µm, more preferably 0.7 to 3 µm, and further preferably 1 to 2 µm.

In the case of a multilayer structure, the heat-sealable resin layer preferably contains a polar resin layer located on the outermost surface, and a nonpolar resin layer located between the polar resin layer and the substrate layer. According to such a configuration, during in-mold molding, not only the polar resin layer but also the nonpolar resin layer fuses with a resin constituting a container, and the adhesiveness improves easily.

As the polar resin layer, a film of a thermoplastic resin having the above-described polar structural unit can be used.

The resin used for the nonpolar resin layer is preferably a thermoplastic resin having a low melting point of 60 to 130° C. from the viewpoint of obtaining sufficient adhesiveness to a molded article even under low temperature conditions in stretch blow molding. As the melting point becomes higher, blocking, particularly cut blocking, becomes less likely to occur. As the melting point becomes lower, the nonpolar resin layer melts more easily during in-mold molding, and the adhesive strength increases more easily. Therefore, this melting point is more preferably 70 to 100° C., further preferably 75 to 90° C.

The thermoplastic resin used for the nonpolar resin layer is preferably a polyethylene resin. The polyethylene resin may be a homopolymer of ethylene or a copolymer of a monomer copolymerizable with ethylene and ethylene. Examples of the monomer copolymerizable with ethylene include monomers having no heteroatom such as α-olefins having 3 to 10 carbon atoms (preferably 3 to 8 carbon atoms) and styrene; and monomers having a heteroatom such as vinyl acetate, (meth)acrylic acid, alkyl (meth)acrylate esters in which the number of carbon atoms of the alkyl group is 1 to 8, and maleic anhydride. Among these, from the viewpoint of water resistance, monomers having no heteroatom are preferably not used.

The proportion of the structural unit derived from ethylene in the polyethylene resin is preferably 80 mol % or more, more preferably 95 mol % or more, and further preferably 97 mol % or more from the viewpoint of increasing adhesiveness at low temperature. The upper limit of the proportion is less than 100 mol %. On the other hand, from the viewpoint of blocking suppression, the proportion of the structural unit derived from the monomer copolymerizable with ethylene in the polyethylene resin is preferably 5 mol % or less, more preferably 3 mol or less. The lower limit of the proportion exceeds 0 mol.

In the case of a two-layer structure, the thickness of the polar resin layer is preferably 0.05 µm or more, more preferably 0.1 µm or more, and further preferably 0.3 µm or more from the viewpoint of obtaining sufficient adhesiveness. On the other hand, the thickness of the polar resin layer is preferably 2 µm or less, more preferably 1.6 µm or less, further preferably 1.2 µm or less, and particularly preferably 1 µm or less from the viewpoint of suppressing cohesive failure. The thickness of the nonpolar resin layer is preferably 1 µm or more, more preferably 2 µm or more, from the viewpoint of obtaining sufficient adhesiveness. From the viewpoint of suppressing cohesive failure inside the heat-sealable resin layer, the thickness of the nonpolar resin layer is preferably 5 µm or less, more preferably 3 µm or less.

The total thickness of the nonpolar resin layer and the polar resin layer is preferably 1.5 µm or more, more preferably 1.6 µm or more, and further preferably 1.7 µm or more from the viewpoint of adhesiveness improvement. On the other hand, the total thickness of the nonpolar resin layer and the polar resin layer is preferably 8 µm or less, more preferably 6 µm or less, and further preferably 4 µm or less from the viewpoint of suppressing cohesive failure inside the heat-sealable resin layer.

The surface of the heat-sealable resin layer may be subjected to the same activation treatment as the substrate layer from the viewpoint of increasing the adhesiveness to the adhesive strength decrease-inhibiting layer described later.

(Adhesive Strength Decrease-Inhibiting Layer)

The adhesive strength decrease-inhibiting layer is provided on the outermost surface on the other surface side of the substrate layer, on which the heat-sealable resin layer is provided. The adhesive strength decrease-inhibiting layer is preferably laminated so as to be adjacent to the heat-sealable resin layer, from the viewpoint of maintaining the adhesiveness of the heat-sealable resin layer. The adhesive strength decrease-inhibiting layer contains a (meth)acrylic acid based copolymer having a polar group. This adhesive strength decrease-inhibiting layer can suppress a decrease in the adhesiveness of the heat-sealable resin layer due to the silicone in the protective layer.

In-mold labels are manufactured as a long sheet, and then cut, stacked and stored as sheets, or wound and stored in the form of a roll. In the case of in-mold labels including no adhesive strength decrease-inhibiting layer, the protective layer of one in-mold label and the heat-sealable resin layer of the other in-mold label are adjacent to each other. At this time, depending on the storage situation, the silicone may transfer from the protective layer to the adjacent heat-sealable resin layer, and a phenomenon in which the adhesiveness of the heat-sealable resin layer to which the silicone transfers decreases is confirmed.

On the other hand, in the in-mold label of the present invention, the adhesive strength decrease-inhibiting layer is provided on the outermost surface on the other surface side of the substrate layer, and the adhesive strength decrease-inhibiting layer is interposed between the heat-sealable resin layer and the protective layer, and thus the silicone can be prevented from getting directly to the heat-sealable resin layer. Thus, it is presumed that the influence of the silicone on the heat-sealable resin layer can be decreased, and a decrease in adhesiveness can be suppressed. The mechanism is not clear, but it is presumed that the (meth)acrylic acid based copolymer having a polar group in the heat-sealable resin layer acts to decrease the influence of the silicone on the adhesiveness of the heat-sealable resin layer. In addition, the good adhesiveness of the (meth)acrylic acid based copolymer having a polar group itself to PET resins and the improved adhesiveness to containers made of PET resins are also presumed to be one of adhesiveness decrease suppression effects.

Figure 2:
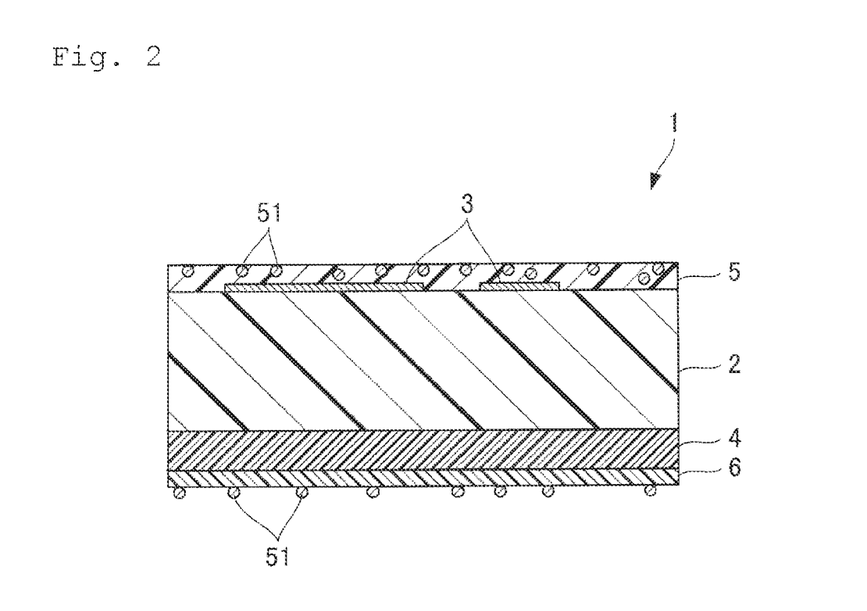
FIG. 2 is a cross-sectional view showing an in-mold label in which the silicone on the protective layer side transfers to the heat-sealable resin layer side when labels are stacked on each other.

FIG. 2 shows one in-mold label 1 when the in-mold labels 1 of FIG. 1 are stacked on each other and then separated.

As shown in FIG. 2, the silicone transfers from another in-mold label 1 stacked on the heat-sealable resin layer 4 side, but the adhesive strength decrease-inhibiting layer 6 is interposed, and thus the silicone getting to the heat-sealable resin layer 4 is prevented.

The (meth)acrylic acid based copolymer having a polar group may be anionic, cationic, or amphoteric as long as it has polarity. From the viewpoint of increasing the effect of suppressing a decrease in the adhesiveness of the heat-sealable resin layer, a (meth)acrylic acid based copolymer having a cationic group is preferred, and a water-soluble (meth)acrylic acid based copolymer having a cationic group is more preferred. When the (meth)acrylic acid based copolymer having a polar group is water-soluble, the formation of the adhesive strength decrease-inhibiting layer becomes easy by preparing a coating liquid using an aqueous solvent followed by coating with the coating liquid. The (meth)acrylic acid based copolymer having a polar group can be used, for example, with an ethylenimine based copolymer, a water-soluble polymer having a quaternary ammonium salt structure or a phosphonium salt structure, or a vinyl polymer obtained by cationizing a water-soluble polymer such as polyvinylpyrrolidone or polyvinyl alcohol by modification. One or more of these can be used in combination.

Among (meth)acrylic acid based copolymers having a cationic group, an amino group-containing (meth)acrylic acid based copolymer is preferred from the viewpoint of suppressing adhesiveness decrease.

As used herein, a cationic group refers to a group positively charged at the time of dissolution in water. The cationic group can be, for example, (A) a group that can be bonded to an anion to form a salt, or (B) a group that is bonded to a proton in the presence of an acid (for example, acetic acid) to form a cation and be capable of being bonded to an acid anion. The above group of (A) can be, for example, an ammonium salt group or a phosphonium salt group together with an anion. The above group of (B) can be, for example, a nitrogen compound group such as an amino group.

An amino group is a group represented by the following formula (a), and $R^1$ and $R^2$ can each independently be a hydrogen atom, an alkyl group having 1 to 3 carbon atoms, or an alkenyl group having 1 to 3 carbon atoms. A cationic group constituting an ammonium salt group is a group represented by the following formula (b), and $R^3$ to $R^5$ can each independently be an alkyl group having 1 to 3 carbon atoms, or an alkenyl group having 1 to 3 carbon atoms. As used herein, when $R^1$ and $R^2$ are both hydrogen atoms, the group represented by the following formula (a) is a primary amino group. When either one of $R^1$ and $R^2$ is a hydrogen atom, the group represented by the following formula (a) is a secondary amino group. When neither of $R^1$ and $R^2$ is a hydrogen atom, the group represented by the following formula (a) is a tertiary amino group. The group represented by the following formula (b) is a quaternary amino group.

$$—NR^1R^2 \qquad\qquad\qquad (a)$$

$$—N^+R^3R^4R^5 \qquad\qquad\qquad (b)$$

The amino group-containing (meth)acrylic acid based copolymer preferably has a primary to tertiary amino group, more preferably a secondary or tertiary amino group, and further preferably a tertiary amino group from the viewpoint of adhesiveness improvement. The above "(meth)acrylic acid based copolymer" in the "(meth)acrylic acid based copolymer having a polar group" contained in the adhesive strength decrease-inhibiting layer can be different from the thermoplastic resin having heat sealability contained in the heat-sealable resin layer. In other words, the "(meth)acrylic acid based copolymer having a polar group" contained in the adhesive strength decrease-inhibiting layer need not have heat sealability and may have a melting point of, for example, less than 60° C., −50 to 50° C., or −20 to 40° C., or no melting point. The "(meth)acrylic acid based copolymer having a polar group" may have a glass transition point of, for example, −50 to 70° C., −20 to 60° C., or 0 to 50° C.

The adhesive strength decrease-inhibiting layer can contain other aid components such as an antistatic agent, a crosslinking accelerator, an antiblocking agent, a pH-adjusting agent, and an antifoaming agent, as needed.

(Antistatic Agent)

The adhesive strength decrease-inhibiting layer preferably contains an antistatic agent from the viewpoint of decreasing the adhesion of dust, and poor conveyance during printing, due to charging.

Among antistatic agents, polymeric antistatic agents are preferred from the viewpoint of decreasing the contamination of the surface due to bleedout, and the like. The polymeric antistatic agents are not particularly limited, and cationic, anionic, amphoteric, or nonionic antistatic agents can be used. These can be used singly or in combinations of two or more thereof.

As the cationic antistatic agents, antistatic agents having an ammonium salt structure, a phosphonium salt structure, can be illustrated. As the anionic antistatic agents, antistatic agents having the structures of alkali metal salts (lithium salts, sodium salts, potassium salts, and the like) of sulfonic acid, phosphoric acid, carboxylic acid, and the like can be illustrated. The anionic antistatic agents may be antistatic agents having the structures of alkali metal salts of acrylic acid, methacrylic acid, maleic acid (maleic anhydride), and the like in the molecular structure.

As the amphoteric antistatic agents, antistatic agents containing the structures of both a cationic antistatic agent and an anionic antistatic agent in the same molecule can be illustrated. Examples of the amphoteric antistatic agents include betaine antistatic agents. As the nonionic antistatic agents, ethylene oxide polymers having an alkylene oxide structure, polymers having an ethylene oxide polymerization component in the molecular chain, and the like can be illustrated. Examples of other antistatic agents include polymeric antistatic agents having boron in the molecular structure.

Among these, as the polymeric antistatic agents, cationic antistatic agents are preferred, nitrogen-containing polymeric antistatic agents are more preferred, antistatic agents having an ammonium salt structure are further preferred, and tertiary nitrogen- or quaternary nitrogen-containing acrylic resins are particularly preferred.

As the polymeric antistatic agents, commercial products such as SAFTOMER ST-1000, ST-1100, and ST-3200 (trade names) manufactured by Mitsubishi Chemical Corporation can be used.

As the polymeric antistatic agents, compounds that react with a silane coupling agent may be used, or compounds that do not react with a silane coupling agent may be used. However, from the viewpoint of the ease of exhibiting antistatic performance, compounds that do not react with a silane coupling agent are preferred.

The content of the antistatic agent in the adhesive strength decrease-inhibiting layer is preferably 0.01 parts by mass or more, more preferably 1 part by mass or more, and further preferably 2 parts by mass or more based on 100 parts by mass of the (meth)acrylic acid based copolymer having a polar group from the viewpoint of static charge prevention. From the viewpoint of water resistance, the content of the antistatic agent in the adhesive strength decrease-inhibiting layer is preferably 85 parts by mass or less, more preferably 75 parts by mass or less, further preferably 70 parts by mass or less, and particularly preferably 65 parts by mass or less based on 100 parts by mass of the (meth)acrylic acid based copolymer having a polar group.
(Crosslinking Accelerator)

Examples of the crosslinking accelerator include phosphoric acid, sulfuric acid, citric acid, and succinic acid.
(Antiblocking Agent)

Examples of the antiblocking agent include silica, light calcium carbonate, and beads of acrylic polymers such as alkyl acrylate ester copolymers.

The thickness of the adhesive strength decrease-inhibiting layer is preferably 0.01 µm or more, more preferably 0.03 µm or more, and further preferably 0.1 µm or more from the viewpoint of exhibiting an adhesive strength decrease inhibition effect. The thickness of the adhesive strength decrease-inhibiting layer is preferably 7 µm or less, more preferably 3 µm or less, and further preferably 1 µm or less from the viewpoint of maintaining the adhesiveness of the heat-sealable resin layer.
(Method for Manufacturing In-Mold Label)

The method for manufacturing the in-mold label is not particularly limited, and the in-mold label can be manufactured by a method of laminating a heat-sealable resin layer on one surface of a substrate layer.

Examples of a method for molding a film of a substrate layer having a single-layer structure include extrusion (cast molding) by a T-die, inflation molding by an O-die, and calendering by a rolling roll. Examples of a method for molding a film of a substrate layer having a multilayer structure include a method of supplying thermoplastic resin compositions used for layers to different extruders respectively, melting the thermoplastic resin compositions, supplying the thermoplastic resin compositions discharged from the extruders to a T-die or an O-die having a multilayer die configuration, laminating the thermoplastic resin compositions in the multilayer die, and discharging the laminate in the form of a film. A thermoplastic resin composition can also be extrusion-laminated on a single-layer or multilayer sheet. According to this method, a paper substrate can also be used for the substrate layer.

Examples of the method for laminating a heat-sealable resin layer on the other surface of a substrate layer include a coextrusion method, an extrusion lamination method, an application method, and a film bonding method.

In the coextrusion method, a thermoplastic composition for a substrate layer and a thermoplastic composition for a heat-sealable resin layer (there may be a plurality of thermoplastic compositions for each) are supplied to a multilayer die, laminated in the multilayer die, and extruded, and therefore lamination is performed simultaneously with molding.

In the extrusion lamination method, a substrate layer is previously molded, a molten thermoplastic composition for a heat-sealable resin layer is laminated on the substrate layer, and the laminate is nipped by a roll while being cooled, and therefore molding and lamination are performed in separate steps.

In the film bonding method, a substrate layer and a heat-sealable resin layer are each film-molded, and both are bonded via a pressure-sensitive adhesive, and therefore molding and lamination are performed in separate steps.

When the heat-sealable resin layer is composed of a nonpolar resin layer and a polar resin layer, it is possible to laminate a nonpolar resin layer on one surface of a substrate layer by the above method and further provide a polar resin layer by an application method. Examples of the application method can include a solvent coating method and an aqueous coating method.

Among these methods, the coextrusion method is preferred from the viewpoint of being able to strongly adhere the layers.

The substrate layer or the heat-sealable resin layer may be an unstretched film or a stretched film.

Examples of the stretching method include a longitudinal stretching method using the peripheral speed difference of a group of rolls, a transverse stretching method using a tenter oven, a sequential biaxial stretching method combining these, a rolling method, a simultaneous biaxial stretching method by a combination of a tenter oven and a pantograph, and a simultaneous biaxial stretching method by a combination of a tenter oven and a linear motor. A simultaneous biaxial stretching (inflation molding) method in which a molten resin is extruded in the form of a tube using a circular die connected to a screw extruder, and then air is blown into the extrudate, and the like can also be used.

The substrate layer and the heat-sealable resin layer may be individually stretched before the layers are laminated, or stretched together after being laminated. The stretched layers may be stretched again after lamination.

When the thermoplastic resins used for the layers are non-crystalline resins, the stretching temperature when stretching is carried out is preferably in the range of the glass transition points of the thermoplastic resins or more. The stretching temperature when the thermoplastic resins are crystalline resins is preferably within the range of the glass transition points of the non-crystalline portions of the thermoplastic resins or more and the melting points of the crystalline portions of the thermoplastic resins or less, and specifically a temperature 2 to 60° C. lower than the melting points of the thermoplastic resins is preferred.

The stretching speed of the thermoplastic resin film is not particularly limited but is preferably within the range of 20 to 350 m/min from the viewpoint of stable stretch-molding.

The stretching ratio when the thermoplastic resin film is stretched can also be appropriately determined considering the properties of the thermoplastic resin used, and the like. For example, when a thermoplastic resin film containing a homopolymer of propylene or a copolymer thereof is stretched in one direction, its stretching ratio is usually about 1.2 times or more, preferably 2 times or more, and on the other hand, usually 12 times or less, preferably 10 times or less. The stretching ratio in the case of biaxial stretching is usually 1.5 times or more, preferably 10 times or more, and on the other hand, usually 60 times or less, preferably 50 times or less, in terms of area stretching ratio.

Within the above range of the stretching ratio, the target porosity is obtained, and the opaqueness improves easily. In addition, the breakage of the thermoplastic resin film is less likely to occur, and stable stretch-molding tends to be possible.

By coating the heat-sealable resin layer laminated on the substrate layer with a coating liquid for an adhesive strength decrease-inhibiting layer, an adhesive strength decrease-inhibiting layer is provided on the outermost surface on the other surface side of the substrate layer. Examples of the coating method include printing and application. The coating liquid can be prepared by dissolving or dispersing the components of the adhesive strength decrease-inhibiting layer, such as a (meth)acrylic acid based copolymer having polarity, in a solvent. When the (meth)acrylic acid based copolymer having polarity is water-soluble, a water-soluble coating liquid can be prepared using an aqueous solvent. This is preferred because of easy process control and also from a safety viewpoint. The aqueous solvent may contain water as a main component and contain a water-soluble organic solvent such as methyl alcohol, ethyl alcohol, isopropyl alcohol, acetone, methyl ethyl ketone, ethyl acetate, toluene, and xylene. Containing water as a main component means that 50% by mass or more of the whole is water.

The coating with the coating liquid and the drying of the coating film may be carried out in-line with the molding of the substrate layer or off-line. The coating mass of the coating liquid can be appropriately adjusted considering the thickness of the adhesive strength decrease-inhibiting layer after drying, the concentrations of the contained components, and the like. For the application, application apparatuses such as a die coater, a bar coater, a roll coater, a lip coater, a gravure coater, a spray coater, a blade coater, a reverse coater, and an air knife coater can be used. For the drying, drying apparatuses such as a hot air blower and an infrared dryer can be used.

The content (amount of solids) of the (meth)acrylic acid based copolymer having polarity in the coating liquid is preferably 0.5% by mass or more, more preferably 1% by mass or more, from the viewpoint of suppressing a decrease in adhesiveness due to the silicone. The content is preferably 40% by mass or less, more preferably 30% by mass or less, from the viewpoint of the uniformity of the adhesive strength decrease-inhibiting layer.

A printed layer can be provided on the surface of the substrate layer of the in-mold label opposite to the heat-sealable resin layer by printing. Examples of the printed information include the indication of a product, such as a trade name and a logo, a manufacturer, a sales company name, a method of use, and a bar code.

Examples of the printing method include gravure printing, offset printing, flexographic printing, seal printing, and screen printing.

By also providing other layers other than the printed layer, such as a pattern layer, as needed, followed by coating with a coating liquid for a protective layer, a protective layer is provided on the outermost surface on one surface side of the substrate layer. Among these, the protective layer is preferably provided by printing in the same manner as the above printed layer because the step is simple, and protective layer materials can be easily selected from commercial products.

(Label Processing)

The in-mold label of the present invention is processed into a necessary shape and necessary dimensions by cutting or punching. The cutting or punching can also be performed before printing but is preferably performed after printing in terms of the ease of work.

The thickness of the in-mold label is preferably 25 μm or more, more preferably 45 μm or more, from the viewpoint of suppressing creases in the label, and the like. From the viewpoint of suppressing strength decrease due to the thinning of a container in a label boundary portion when providing the in-mold label on the container, the thickness is preferably 200 μm or less, more preferably 150 μm or less. Therefore, the thickness of the in-mold label is preferably 25 to 200 μm, more preferably 45 to 150 μm.

(In-Mold Labeled Container)

The in-mold labeled container of the present invention is a resin container on the surface of which the in-mold label of the present invention described above is provided. In the in-mold label of the present invention, a polyolefin resin film having low cost and excellent in moldability and mechanical strength can be preferably used as the substrate layer, but a thermoplastic resin film having a melting point in a particular range corresponding to the molding temperature of stretch blow molding is used as the heat-sealable resin layer. Therefore, the adhesiveness of the in-mold label is also high to PET resins that can be different in nature from the substrate layer, and the in-mold label of the present invention is a label optimized for stretch blow-molded PET resin containers. However, the heat-sealable resin layer of the in-mold label of the present invention also exhibits high adhesiveness in direct blow molding, and therefore the in-mold label of the present invention can also be used for polyethylene resin containers, polypropylene resin containers, and the like other than PET resin containers.

(Material of Container)

The in-mold label of the present invention has high adhesiveness to PET resins and is optimized as an in-mold label for PET resin containers as described above, but also has good adhesiveness to polyethylene resins, polypropylene resins, and the like other than PET resins, and the material of the container is not particularly limited.

Among these, an in-mold label in which the heat-sealable resin layer has a polar resin layer on the surface can be used for containers of polar resins such as polyester resins such as polyethylene terephthalate (PET), polybutylene terephthalate, polybutylene succinate, and polylactic acid. Examples of polar resin containers that can be used also include containers of other polar resins such as polycarbonate resins, acrylonitrile-styrene (AS) resins, acrylonitrile-butadiene-styrene (ABS) resins, and methyl methacrylate-styrene (MS) resins because the adhesion mechanism is the same as for polyester resins.

The color of the container may be transparent or a natural color having no color of a color material such as a pigment or a dye, or may be an opaque color due to a color material or coloration.

The cross-sectional shape of the body of the container may be a true circle or may be an ellipse or a rectangle. When the cross-sectional shape of the body is a rectangle, the corners preferably have a curvature. From the viewpoint of strength, the cross section of the body is preferably a true circle or an ellipse close to a true circle, more preferably a true circle.

(Method for Manufacturing In-Mold Labeled Container)
(In-Mold Molding)

The method for manufacturing the in-mold labeled container of the present invention is not particularly limited as long as an in-mold label can be provided on the surface of a resin container during the in-mold molding of the resin container.

Examples of the in-mold molding method suitable for the use of the in-mold label of the present invention include stretch blow molding, direct blow molding, injection molding, and differential pressure molding. The in-mold label of the present invention has high adhesiveness even under the low temperature conditions of stretch blow molding and is excellent in adhesiveness, particularly to PET resin containers, as described above.

(Properties of In-Mold Label and In-Mold Labeled Container)

A labeled container in which an in-mold label is affixed to the surface of a container is obtained as described above. The in-mold labeled container of the present invention preferably has the following properties.

(Adhesive Strength)

The adhesive strength between the resin container and the in-mold label is measured according to JIS K6854-2: 1999 "Adhesives—Determination of peel strength of bonded assemblies—Part 2: 1800 peel". Under a situation in which no blisters (bubbles) occur between the container and the label, the above adhesive strength is preferably 3 N/15 mm or more, more preferably 3.5 N/15 mm or more, and further preferably 4 N/15 mm or more. On the other hand, the upper limit of the above adhesive strength is not particularly limited but is preferably 15 N/15 mm or less in terms of the cohesive failure strength of the heat-sealable resin layer.

(Adhesive Strength Maintenance Rate)

In a labeled container using an in-mold label on one surface of which a protective layer is provided, the adhesive strength maintenance rate is the value, expressed in percentage, of the ratio of the above adhesive strength between the in-mold label influenced by silicone transfer from the protective layer and the container when the above adhesive strength between the in-mold label not influenced by silicone transfer from the protective layer and the container is 100%.

The adhesive strength maintenance rate tends to become higher as the surface on the heat-sealable resin layer side becomes less likely to be influenced by the silicone transferring from the protective layer. The adhesive strength maintenance rate is preferably 60% or more, more preferably 70% or more, and further preferably 80% or more. The upper limit of the adhesive strength maintenance rate is usually 100% but may exceed 100%. The transfer properties of the silicone can be confirmed as follows.

(Transfer Properties of Silicone)

The transfer properties of the silicone from the protective layer to the heat-sealable resin layer when the in-mold labels of the present invention are stacked on each other can be confirmed from the Si atom concentration (atm %) of the heat-sealable resin layer including the adhesive strength decrease-inhibiting layer. The Si atom concentration (atm %) is obtained by measuring the surface on the heat-sealable resin layer side of the in-mold label by the XPS method.

EXAMPLES

Manufacturing Example 1

(Laminate of Substrate Layer and Heat-Sealable Resin Layer)

As the material of a substrate layer, 84% by mass of a propylene homopolymer (manufactured by Japan Polypropylene Corporation, product name: NOVATEC PP MA4, MFR: 5 g/10 min, melting point: 167° C.), 15% by mass of a heavy calcium carbonate fine powder (manufactured by Bihoku Funka Kogyo Co., Ltd., product name: SOFTON #1800, volume-average particle diameter: 1.8 µm), and 1% by mass of a rutile titanium dioxide fine powder (manufactured by ISHIHARA SANGYO KAISHA, LTD., product name: TIPAQUE CR-60, volume-average particle diameter: 0.2 µm) were mixed, and the mixture was melted and kneaded in an extruder heated to 230° C., and supplied to a two-layer coextrusion die.

On the other hand, metallocene polyethylene (manufactured by Japan Polyethylene Corporation, product name: Kernel KS571, MFR: 12 g/10 min, melting point: 100° C., density: 0.907 g/cm$^3$) was used as the material of a heat-sealable resin layer, and this was melted in an extruder heated to 210° C., and supplied to the two-layer coextrusion die.

The material of a substrate layer and the material of a heat-sealable resin layer were laminated in the two-layer coextrusion die and extruded from the die as a sheet having a two-layer structure, and this was cooled by a cooling apparatus to obtain an unstretched sheet having a two-layer structure.

This unstretched sheet was heated to 150° C. and stretched 5 times in the longitudinal direction using the peripheral speed difference of a group of a plurality of rolls. Then, this was cooled to a temperature of 60° C., then heated to a temperature of 150° C. again, stretched 8 times in the transverse direction using a tenter, subjected to annealing treatment at a temperature of 160° C., and cooled to a temperature of 60° C. to obtain a white opaque biaxially stretched polyolefin resin film having a two-layer structure.

Then, the edge portions of the biaxially stretched polyolefin resin film were slit, and then the biaxially stretched polyolefin resin film was guided to a corona discharge treatment apparatus. Both surfaces on the substrate layer side and the heat-sealable resin layer side were each subjected to corona discharge treatment with an amount of treatment of 50 W/m$^2$, and the biaxially stretched polyolefin resin film was wound in the form of a roll by a winder.

The total thickness of the obtained biaxially stretched polyolefin resin film was 70 µm, and the density was 0.76 g/cm$^3$. In the film, the thickness of the substrate layer was 68 µm, and the thickness of the heat-sealable resin layer was 2 µm.

Manufacturing Example 2

A reactor having an internal volume of 150 L equipped with a reflux condenser, a nitrogen introduction tube, pumping machine, a thermometer, a dropping funnel, and a heating jacket was charged with 40 kg of isopropanol (manufactured by Tokuyama Corporation, product name: TOKUSO IPA). While this was stirred, 12.6 kg of N,N-dimethylaminoethyl methacrylate (manufactured by Sanyo Chemical Industries, Ltd., product name: Methacrylate DMA), 12.6 kg of butyl methacrylate (manufactured by MITSUBISHI RAYON CO., LTD., product name: Acrylester B), and 2.8 kg of a higher alcohol methacrylate (manufactured by MITSUBISHI RAYON CO., LTD., product name: Acrylester SL, mixture of lauryl methacrylate and tridecyl methacrylate) were introduced into the reactor. Then, nitrogen replacement in the system was performed, and the temperature in the reactor was raised to 80° C., and then 0.3 kg of 2,2'-azobisisobutyronitrile (manufactured by Wako Pure Chemical Industries, Ltd., product name: V-60 (AIBN)) as a polymerization initiator was introduced into the reactor.

With the temperature in the reactor kept at 80° C., stirring was continued for 4 hours to perform a copolymerization reaction. Then, after cooling to ordinary temperature, 4.3 kg of glacial acetic acid (manufactured by Wako Pure Chemical Industries, Ltd.) was introduced into the reactor to neutralize the obtained copolymer. Then, while 48.3 kg of ion-exchanged water was introduced into the reactor, the isopropanol was distilled off for aqueous replacement in the system, to obtain a viscous aqueous solution (solid concentration 35% by mass) of a methacrylic acid based copolymer having a tertiary amino group as a polar group in a side chain (having no melting point, weight-average molecular weight 40,000). The obtained methacrylic acid based copolymer was bonded to a proton and bonded to an acetic acid ion as a cation in the aqueous solution, and therefore it was confirmed that the above polar group was a cationic group.

Manufacturing Example 3

96.7 parts by mass of an OP varnish (manufactured by T&K TOKA CO., LTD., product name: L Carton OP Varnish KS), 3 parts by mass of a silicone basis (manufactured by T&K TOKA CO., LTD., product name: UV Reactive Silicone A), and 0.3 parts by mass of a silicone aid (manufactured by T&K TOKA CO., LTD., product name: UV Reactive Silicone B) were mixed to obtain a coating liquid for a protective layer containing a silicone.

Example

A coating liquid in which the methacrylic acid based copolymer having a polar group obtained in the above Manufacturing Example 2 was diluted with ion-exchanged water to a solid concentration of 10% by mass was prepared. The surface on the heat-sealable resin layer side of the biaxially stretched polyolefin resin film obtained in the above Manufacturing Example 1 was coated with the prepared coating liquid using a gravure coater, and dried in an oven at 80° C. to form an adhesive strength decrease-inhibiting layer. The thickness of the obtained adhesive strength decrease-inhibiting layer was 0.5 µm.

Then, a pattern having letters (MS Gothic, 6 to 20 points) was printed on the surface on the substrate layer side of the biaxially stretched polyolefin resin film using a flexographic printing machine (manufactured by MT TECH CO LTD, equipment name: FC11B) and a UV flexographic ink (manufactured by T&K TOKA CO., LTD., product name: Flexo 500), to provide a printed layer.

Then, the printed layer was coated with the coating liquid for a protective layer obtained in Manufacturing Example 3 using a gravure roll, and irradiated with energy of 800 J by an ultraviolet lamp to cure the coating liquid for a protective layer to form a protective layer, thereby obtaining the in-mold label of an Example. The thickness of the protective layer after the curing was 2.5 µm.

Comparative Example 1

A coating liquid in which instead of the (meth)acrylic acid based copolymer having a polar group used in the above Example, an aqueous dispersion of an ethylene-methyl methacrylate copolymer (manufactured by Japan Coating Resin Corporation, product name: AQUATEX AC-1127, solid concentration 45%, by mass, melting point 95° C.) was diluted with ion-exchanged water to a solid concentration of 10% by mass was prepared, and this was used. The ethylene-methyl methacrylate copolymer used here is a copolymer having no polar group. The surface on the heat-sealable resin layer side of the biaxially stretched polyolefin resin film obtained in the above Manufacturing Example 1 was coated with the prepared coating liquid using a gravure coater, and dried in an oven at 80° C. to form an adhesive strength decrease-inhibiting layer. The thickness of the adhesive strength decrease-inhibiting layer was 0.5 µm.

Then, in the same manner as the above Example, a pattern having letters (MS Gothic, 6 to 20 points) was printed on the surface on the substrate layer side of the biaxially stretched polyolefin resin film using a flexographic printing machine (manufactured by MT TECH CO LTD, equipment name: FC11B) and a UV flexographic ink (manufactured by T&K TOKA CO., LTD., product name: Flexo 500), to provide a printed layer.

Then, the printed layer was coated with the coating liquid for a protective layer obtained in Manufacturing Example 3 using a gravure roll, and irradiated with energy of 800 J by an ultraviolet lamp to cure the coating liquid for a protective layer to form a protective layer to obtain the in-mold label of Comparative Example 1. The thickness of the protective layer after the curing was 2.5 µm.

Comparative Example 2

The in-mold label of Comparative Example 2 was obtained in the same manner as Example 1 except that the adhesive strength decrease-inhibiting layer was not provided.

<Evaluation Methods>
[In-Mold Label Physical Properties]
(Thickness of Each Layer)

The thickness (total thickness) of an in-mold label was measured in accordance with JIS K7130: 1999 using a constant pressure thickness gauge (manufactured by TECLOCK, product name: PG-01J). The thickness of each layer in the in-mold label was obtained as follows. A specimen to be measured was cooled to a temperature of −60° C. or less with liquid nitrogen. A razor blade (manufactured by Schick Japan K.K., product name: Proline Blade) was placed at right angles to the specimen placed on a glass plate, and the specimen was cut to fabricate a cross-sectional observation specimen. The cross section of the obtained specimen was observed using a scanning electron microscope (manufactured by JEOL Ltd., product name: JSM-6490), and the boundary line for the thermoplastic resin composition of each layer was distinguished from the appearance. The total thickness of the in-mold label was multiplied by the thickness ratio of each layer observed to obtain the thickness of each layer.

[Properties of Labeled Container]

Each of the in-mold labels obtained in the Example and the Comparative Examples was cut in the form of a sheet immediately after fabrication and punched into a rectangle having a long side of 8 cm and a short side of 6 cm to fabricate each evaluation sample (A). Separately, each of the in-mold labels obtained in the Example and the Comparative Examples was wound in the form of a roll and brought into a state in which the surface of the protective layer that was one outermost layer, and the surface of the adhesive strength decrease-inhibiting layer that was the other outermost layer were in contact with each other, and this was allowed to stand in an environment at a temperature of 25° C. and a relative humidity of 50% for 8 days. Then, the in-mold label in the form of a roll was unwound, cut in the form of a sheet, and punched into a rectangle having a long side of 8 cm and a short side of 6 cm to fabricate each evaluation sample (B).

The punched in-mold label was charged using an electrostatic charging apparatus, continuously placed inside the molding mold of a stretch blow molding machine (manufactured by NISSEI ASB MACHINE CO., LTD., equipment name: ASB-70DPH), and clamped. The placement was performed so that the protective layer was in contact with the mold (the adhesive strength decrease-inhibiting layer faced the cavity side). The in-mold label was placed so that the long sides of the label were parallel to the peripheral direction of the body of a resin container in the mold. The mold was controlled so that the surface temperature on the cavity side was within the range of 20 to 45° C.

On the other hand, a preform made of a polyethylene terephthalate resin was preheated to 100° C. Next, the preform was guided to the mold and stretch blow-molded under a blow pressure of 5 to 40 kg/cm² for 1 second. Then, the molded material was cooled to 50° C. in 15 seconds.

Next, the mold was opened to obtain an in-mold labeled container having a square body portion having a height of 12 cm and a side of about 7 cm.

(Adhesive Strength of In-Mold Label)

The obtained in-mold labeled containers were stored in an environment at a temperature of 23° C. and a relative humidity of 50%, for 2 days. Next, the label and container main body of each in-mold labeled container in the portion in which the label was provided were integrally cut off by a cutter to take, from two containers, a total of six measurement samples having a length of 12 cm (8 cm for the label-affixed portion and 4 cm for the unaffixed portion) and a width of 1.5 cm (the label was affixed across the full width) in which the peripheral direction of the body of the container was the longitudinal direction.

Next, the label-affixed portion was carefully peeled from the label-unaffixed portion, and about 1 cm of the label-affixed portion was peeled to form a grip. Next, the grip and a PET film having a width of 1.5 cm (thickness 50 μm) were stacked and adhered with a pressure-sensitive adhesive to form a grip portion on the label side to fabricate an adhesive strength measurement sample.

A 180° peel test between the container body portion and the label was carried out based on JIS K6854-2: 1999 under the condition of a peel speed of 300 mm/min using a tensile tester (manufactured by SHIMADZU CORPORATION, model name: Autograph AGS-5kNJ). The value obtained by measuring the average value of peel force for peel lengths of 25 to 75 mm and further averaging the measured values of the six samples was taken as adhesive strength. The unit of the adhesive strength was N/15 mm. The results are shown in Table 1.

(Si Atom Concentration)

Each of the evaluation samples (A) and samples (B) of the Example and the Comparative Examples fabricated as described above (four types in total) was punched into such dimensions that it fitted into a sample holder having an aperture diameter of 400 μm, to fabricate three test pieces for XPS (X-ray photoelectron spectrometer) measurement. Then, the measurement of the amount of Si atoms and the amount of all atoms on the surface on the adhesive strength decrease-inhibiting layer side of the in-mold label was performed three times for one test piece using an XPS measuring apparatus (manufactured by Thermo Fisher Scientific K.K., trade name "K-ALPHA"). The proportion of Si atoms when the measurement result of the amount of all atoms was 100 atm % was obtained, and the average value of the three measurements for the three was taken as Si atom concentration (atm %).

Usually, in the sample (A) not influenced by silicone transfer from the protective layer, the raw materials used contain no Si atoms, and therefore the measurement result of Si atom concentration is 0 atm %, but in the sample (B) influenced by silicone transfer from the protective layer, a significant amount is measured, and as the amount becomes larger, it is indicated that a larger amount of the silicone transfers.

TABLE 1

|  |  | Example | Comparative Example 1 | Comparative Example 2 |
|---|---|---|---|---|
| Adhesive strength decrease-inhibiting layer |  | (Meth)acrylic acid based copolymer having polar group | (Meth)acrylic acid based copolymer having no polar group | None |
| Si atom concentration [atm %] | Sample (A) | 0 | 0 | 0 |
|  | Sample (B) | 6.8 | 7.1 | 7.6 |
| Adhesive strength [N/15 mm] | Sample (A) | 3.99 | 5.32 | 6.20 |
|  | Sample (B) | 3.28 | 2.73 | 3.00 |
| Adhesive strength maintenance rate [%] |  | 82 | 51 | 48 |

From the measurement results of Si atom concentration shown in the above Table 1, it was found that in the samples (B) influenced by silicone transfer from the protective layer to the surface on the adhesive strength decrease-inhibiting layer side, a large amount of the silicone transferred for both the Example and Comparative Examples 1 and 2.

On the other hand, it was found that for the in-mold label of the Example in which an adhesive strength decrease-inhibiting layer containing a (meth)acrylic acid based copolymer having a polar group was provided as the outermost layer to be in direct contact with a resin container, even the sample (B) influenced by silicone transfer from the protective layer maintained an adhesive strength of 3 N/15 mm or more, and the adhesive strength maintenance rate was as high as 80% or more in comparison with the sample (A) not influenced by silicone transfer from the protective layer. Therefore, an in-mold labeled container having sufficient adhesive strength to a molded article was obtained even when a protective layer containing a silicone was used for the protection of a printed layer, and even under the low temperature conditions of stretch blow molding.

This application claims priority from Japanese Patent Application No. 2018-184065 filed on Sep. 28, 2018, the entire contents of which are incorporated herein.

REFERENCE SIGNS LIST 1 in-mold label
2 substrate layer
3 printed layer
4 heat-sealable resin layer
5 protective layer
51 silicone
6 adhesive strength decrease-inhibiting layer

INDUSTRIAL APPLICABILITY

The in-mold label of the present invention can be widely used as labels to be provided on the surfaces of in-mold molded bodies, for example, resin containers such as PET resin containers and polyethylene resin containers. The in-mold labeled container of the present invention can be widely used as bottle-shaped containers for beverages, and containers for cosmetics, drugs, and the like.

The invention claimed is:
1. An in-mold label comprising:
  a substrate layer; a printed layer provided on one surface of the substrate layer; and a heat-sealable resin layer provided on the other surface of the substrate layer, wherein a protective layer containing a silicone is provided on an outermost surface on one surface side of the substrate layer on which the printed layer is provided, and an adhesive strength decrease-inhibiting layer containing a (meth)acrylic acid based copolymer having a polar group is provided on an outermost surface on the other surface side of the substrate layer on which the heat-sealable resin layer is provided.

2. The in-mold label according to claim 1, wherein the (meth)acrylic acid based copolymer having a polar group is a (meth)acrylic acid based copolymer having a cationic group.

3. The in-mold label according to claim 1, wherein the (meth)acrylic acid based copolymer having a polar group is a (meth)acrylic acid based copolymer having a tertiary amino group.

4. The in-mold label according to claim 1, wherein the in-mold label is an in-mold label for a polyethylene terephthalate resin container.

5. The in-mold label according to claim 1, wherein the heat-sealable resin layer is a polyethylene resin film having a melting point of 60 to 130° C.

6. An in-mold labeled container in which an in-mold label is provided on a surface of a resin container, wherein the in-mold label comprises a substrate layer, a printed layer provided on one surface of the substrate layer, and a heat-sealable resin layer provided on the other surface of the substrate layer, a protective layer containing a silicone is provided on an outermost surface on one surface side of the substrate layer on which the printed layer is provided, and an adhesive strength decrease-inhibiting layer containing a (meth)acrylic acid based copolymer having a polar group is provided on an outermost surface on the other surface side of the substrate layer on which the heat-sealable resin layer is provided.

7. The in-mold label according to claim 1, wherein the (meth)acrylic acid based copolymer having a polar group has a melting point of less than 60° C. or no melting point.

* * * * *